(12) United States Patent
Lim et al.

(10) Patent No.: US 9,294,710 B2
(45) Date of Patent: Mar. 22, 2016

(54) IMAGE COMPARISON DEVICE USING PERSONAL VIDEO RECORDER AND METHOD USING THE SAME

(75) Inventors: Jung Eun Lim, Seoul (KR); Sung Wook Shin, Seoul (KR); Jong Chan Kim, Seoul (KR); In Gu Hwang, Seoul (KR); Seung Kyun Oh, Seoul (KR); Jin Seok Im, Seoul (KR)

(73) Assignee: LG Electronic Inc., Seoul (KR)

( * ) Notice: Subject to any disclaimer, the term of this patent is extended or adjusted under 35 U.S.C. 154(b) by 261 days.

(21) Appl. No.: 12/919,935

(22) PCT Filed: Feb. 25, 2009

(86) PCT No.: PCT/KR2009/000893
§ 371 (c)(1),
(2), (4) Date: Oct. 20, 2010

(87) PCT Pub. No.: WO2009/107975
PCT Pub. Date: Sep. 3, 2009

(65) Prior Publication Data
US 2011/0044602 A1     Feb. 24, 2011

(30) Foreign Application Priority Data
Feb. 29, 2008   (KR) .................. 10-2008-0018764

(51) Int. Cl.
*H04N 5/77* (2006.01)
*H04N 5/781* (2006.01)
(Continued)

(52) U.S. Cl.
CPC ............ *H04N 5/781* (2013.01); *H04N 5/76* (2013.01); *H04N 21/4147* (2013.01); *H04N 21/4223* (2013.01); *H04N 21/4316* (2013.01); *H04N 21/44008* (2013.01)

(58) Field of Classification Search
CPC ... H04N 5/781; H04N 5/76; H04N 21/44008; H04N 21/4316; H04N 21/4147; H04N 21/4223
USPC .......................................... 386/224, 241, 248
See application file for complete search history.

(56) References Cited

U.S. PATENT DOCUMENTS

| 7,095,388 B2 * | 8/2006 | Truxa et al. ................ 345/7 |
| 2004/0263686 A1 * | 12/2004 | Kim ............................. 348/556 |

(Continued)

FOREIGN PATENT DOCUMENTS

| JP | 2001-501394 A | 1/2001 |
| JP | 2006-302122 A | 11/2006 |

(Continued)

OTHER PUBLICATIONS

English Translation of Korean Publication 2007-0074074.*
(Continued)

*Primary Examiner* — William Tran
(74) *Attorney, Agent, or Firm* — KED & Associates LLP

(57) ABSTRACT

The present disclosure relates to an image comparison device using a personal video recorder, the device comprising: a display unit configured to output a reference image; at least one camera configured to obtain a comparison image by taking a picture of a present scene of a subject chasing a movement of an object included in the reference image while the reference image is displayed on the screen of the display unit; and a controller configured to display the comparison image along with the reference image on the screen, and a method using the image comparison device.

28 Claims, 4 Drawing Sheets

(51) Int. Cl.
*H04N 5/76* (2006.01)
*H04N 21/4223* (2011.01)
*H04N 21/431* (2011.01)
*H04N 21/4147* (2011.01)
*H04N 21/44* (2011.01)

(56) References Cited

U.S. PATENT DOCUMENTS

| | | | |
|---|---|---|---|
| 2006/0026207 A1* | 2/2006 | Sakai et al. | 707/104.1 |
| 2006/0125963 A1 | 6/2006 | Baek | |
| 2006/0262191 A1* | 11/2006 | Straney et al. | 348/181 |
| 2006/0291807 A1* | 12/2006 | Ryu et al. | 386/95 |
| 2007/0076947 A1 | 4/2007 | Wang et al. | |
| 2007/0236611 A1* | 10/2007 | Lin et al. | 348/731 |
| 2008/0292174 A1* | 11/2008 | Sato | 382/132 |
| 2008/0317356 A1* | 12/2008 | Itoh et al. | 382/209 |
| 2009/0083710 A1* | 3/2009 | Best et al. | 717/120 |
| 2009/0136210 A1* | 5/2009 | Morimoto | 386/117 |
| 2009/0163262 A1* | 6/2009 | Kang | 463/8 |
| 2010/0013917 A1* | 1/2010 | Hanna et al. | 348/143 |
| 2010/0104158 A1* | 4/2010 | Shechtman et al. | 382/131 |

FOREIGN PATENT DOCUMENTS

| | | |
|---|---|---|
| KR | 10-2003-0041034 A | 5/2003 |
| KR | 10-2004-0039113 | 5/2004 |
| KR | 10-2007-0074074 A | 7/2007 |

OTHER PUBLICATIONS

International Search Report issued in PCT/KR2009/000893 dated Aug. 7, 2009.
International Search Report and Written Opinion dated Aug. 7, 2009 issued in PCT/KR2009/000893.
European Search Report dated Apr. 7, 2011 issued in Application No. 09 71 4764.
Korean Notice of Allowance issued in Application No. 10-2008-0018764 dated Feb. 27, 2015.

* cited by examiner (a)

(b)

IMAGE COMPARISON DEVICE USING PERSONAL VIDEO RECORDER AND METHOD USING THE SAME

TECHNICAL FIELD

The present disclosure relates to an image comparison device using a personal video recorder (PVR) and a method using the same, and more particularly, to an image comparison device and a method using the same capable of displaying different images on a screen of a display unit by means of using the PVR.

BACKGROUND ART

Generally, the PVR is a personal video recoding and replaying device configured to receive a broadcasting signal from a broadcasting system or an A/V (audio/video) device to convert the signal to digital information, to store the information in a HDD (hard disk driver) which is a high capacity memory by encoding (compressing) the information in the form of MPEG2, and to output a decoded image to a display unit such as a television (TV) by reading the recorded information.

The PVR may store a broadcasting program from dozens of minutes to several hours in a memory while the user watches the broadcasting program, wherein the memory is a HDD which is a high capacity memory installed therein. Then, the user may replay the recorded program whenever the user wants. The PVR may be installed in a TV or may be connected to the TV. Moreover, when the user sets a timer recording, the PVR starts to record a specific broadcasting program in the HDD at the time of broadcasting program. Therefore, the user may watch the broadcasting program whenever the user wants. In addition, the PVR can record a plural of programs at the same time and the PVR may stop a screen or repeatedly replay a scene from a few seconds to a few minutes during a live broadcasting. Therefore, the user may watch the programs without any trouble of a program table.

DISCLOSURE OF INVENTION

Technical Problem

Although such a PVR may record a lot of broadcasting programs and provide a replay function, the user may simply watch the broadcasting program stored in HDD of PVR. The user can not practically use the various information provided from the PVR by involving directly.

Technical Solution

An object of the present disclosure is to provide an image comparison device using a personal video recorder. The image comparison device comprises a display unit configured to output a reference image, at least one camera configured to obtain a comparison image by taking a picture of a present scene of a subject chasing a movement of an object included in the reference image while the reference image is displayed on the screen of the display unit, and a controller configured to display a comparison image along with the reference image on the screen.

In another aspect of the present disclosure, the image comparison device may further comprise an encoding/decoding unit configured to encode the comparison image taken by using the camera in MPEG, or configured to decode the MPEG encoded data by means of MPEG; and a memory configured to store the data encoded by means of MPEG.

In another aspect of the present disclosure, the controller may comprise a time entry input point unit configured to store at least one of a recording start time of the comparison image, a recording termination time of the comparison image, and a time information on the each image consisting of the comparison image, by matching the time information to the reference image, while the reference image is displayed on the screen, and a search unit configured to search a position of the reference image and a position of the comparison image stored in the memory.

In another aspect of the present disclosure, the time information on the reference image may comprise at least one of a transport stream information, a program stream information, and an information on position of bit-stream file data corresponding to each still image consisting of the reference image in the memory which stores the reference image.

In another aspect of the present disclosure, the image comparison device may further comprise a video analysis unit configured to generate an analysis data based on a difference between the reference image and the comparison image, wherein the controller is configured to control to output the analysis data to the screen.

In another aspect of the present disclosure, the image comparison device may further comprise a video analysis unit configured to generate an analysis data on the reference image from an object included in the reference image, wherein the controller is configured to control to output the analysis data on the reference image to be overlaid on the comparison image of the screen.

In another aspect of the present disclosure, the image comparison device may further comprise an user input unit configured for a user to directly input an analysis data where the user determines on the comparison image, wherein the controller is configured to output the analysis data on the screen, wherein the analysis data is inputted from the user input unit.

In another aspect of the present disclosure, the reference image may be displayed on a first area of the screen and the comparison image may be displayed on a second area which is different from the first area.

In another aspect of the present disclosure, each the first area and the second area may occupy a half of the screen by dividing the screen.

In another aspect of the present disclosure, the comparison image may be displayed on the screen in the form of PIP (Picture in Picture).

In another aspect of the present disclosure, the reference image and the comparison image may be respectively moving images.

In another aspect of the present disclosure, the comparison image may include a plurality of image units where the subject is taken at different angles.

Another object of the present disclosure is to provide a method for comparing images using a personal video recorder. The method comprises obtaining a comparison image by taking a picture of a present scene of a subject chasing a movement of an object included in a reference image while the reference image is displayed on a screen of a display unit and displaying the comparison image along with the reference image on the screen.

In another aspect of the present disclosure, the method further comprises outputting a sound signal through a speaker on the reference image, while the reference image and the comparison image are displayed on the screen.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

Advantageous Effects

According to the present disclosure, the user may watch on the comparison image and the reference image together.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE FOR CARRYING OUT THE INVENTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
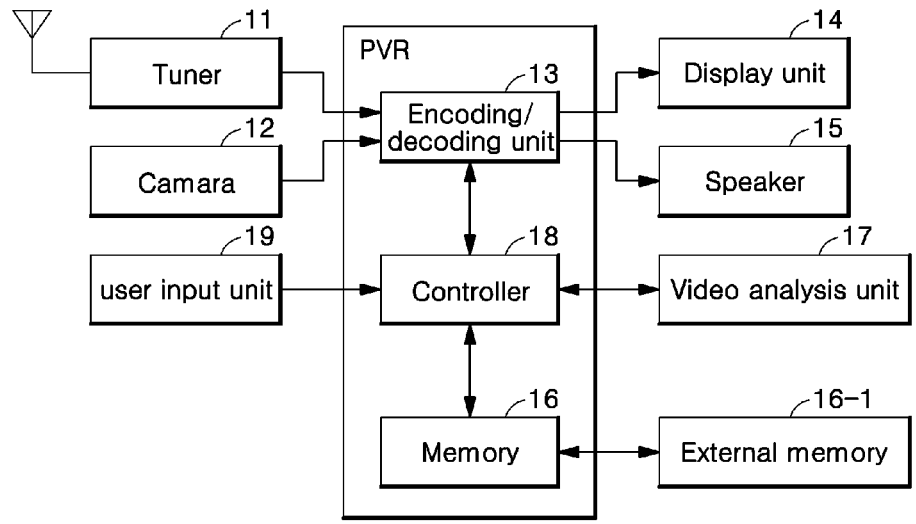
FIG. 1 is a block diagram of am image comparison device using the PVR according to one embodiment of the present disclosure.

FIG. 1 is a block diagram of am image comparison device using the PVR according to one embodiment of the present disclosure.

As shown in FIG. 1, the image comparison device according to the present disclosure comprises a tuner 11, a camera 12, an encoding/decoding unit 13, a display unit 14, a speaker 15, a memory 16, a video analysis unit 17, a controller 18, and a user input unit 19.

A tuner 11 provides a broadcasting signal of a channel to encoding/decoding unit 13 by selecting the broadcasting signal, wherein the channel is what the user wants. The broadcasting signal may include an image signal, a sound signal and an additional information which are received through an antenna, a cable or a satellite.

A camera 12 is a device configured to obtain a comparison image by taking a picture of a present scene of a subject chasing a movement of an object included in the reference image while the reference image is displayed on the screen of the display unit 14. The camera 12 may be one or plural.

Here, the reference image may include a golf image, a yoga image, lesson image on the English pronunciation, a dance moving image which is produced by a user such as UCC (user created contents), or images taken in indoors or outdoors. The object included in the reference may be a lecturer in the lesson images, a dancer in the dance images, or a device or an apparatus positioned indoors or outdoors. Therefore, the movement of the object may be a change of the lecturer's posture and mouth, or the movement of the object included in the reference image such as a dancer's action, or a relative movement of the object which is photographed while the camera is rotated or moved in a state where the device or apparatus located indoors/outdoors is fixed.

In addition, the subject includes a user, a device or indoors/outdoors space which are taken by the camera 12 to produce the comparison image according to the present disclosure. More particularly, while the reference images such as golf, ski, yoga, English pronunciation lesson image, and dance moving image are displayed on the display unit 14, the user may chase or simulate the movement of the lecturer or the dancer included in the reference image for learning. The present scene of the user who simulates the movement of the object included in the reference image is photographed by the camera 12, where the taken picture may be a comparison image according to the present disclosure.

An encoding/decoding unit 13 encodes the comparison image created from camera 12 to provide it to the memory 16, wherein the comparison image is encoded. Alternatively, the encoding/decoding unit 13 decodes the visual data and the sound data stored in the memory 16 to provide it to display unit 14 and speaker 15. Besides, the encoding/decoding unit 13 encodes an image signal and a sound signal from the broadcasting signal provided from the tuner 11 to provide it to display unit 14 and speaker 15. The encoding/decoding unit 13 encodes the comparison image in MPEG to provide it to the memory 16 and decodes the MPEG encoded data by means of MPEG to provide it to the display unit 14 or speaker 15 during replay of the data stored in the memory 16 so that the storing capacity of the memory 13 can be increased.

The display unit 12 visually displays the image signal provided from the encoding/decoding unit 13. Besides, the display unit 12 may output the comparison image which is being taken by the camera 12. In this case, the display unit 12 may be directly connected to the camera 12.

The speaker 12 outputs the sound from the sound signal provided from the encoding/decoding unit 13.

The memory 16 may be a HDD, a high capacity memory, applied to the conventional Personal Video Recorder (PVR), or a flash RAM. The memory 16 may store the broadcasting program received from tuner 11, as well as the comparison image inputted from the camera 12. Besides, the memory 16 may obtain an image file from an external memory 16-1 by being directly connected to the external memory such as an external memory card, a USB (universal serial bus), and contents providing server connected by online. Accordingly, the reference image may constitute a pre-stored data in the memory 16, and the broadcasting program provide from the tuner 11 and the image file provided from the external memory 16-1.

The video analysis unit 17 generates an analysis data based on a difference between the reference image and the comparison image according to the present disclosure while the reference image is presently received from the tuner 11 or pre-stored in the memory 16, wherein the comparison image is obtained by the camera.

The analysis data, for example, in case that posture in the reference image such as golf, ski and yoga lesson images, and dance moving images, is important element, may comprise the posture correction information which is generated on the basis of a difference between the reference image and the comparison image by using the human's basic skeleton structure as a basic human body model, by searching a match point between the reference image and comparison image, and by analyzing similarity of the motion and so on. At this moment, the human's basic skeleton structure is displayed as a line, human's joint is displayed as a point where a line and a line meet. Accordingly, the analysis data on the posture shape of human may be obtained, when the human's basic skeleton structure is analyzed around a head portion of a human, Alternatively, in a case the reference image is for teaching the English pronunciation, the analysis data may include a pronunciation correction information which is generated on the basis of a difference between a mouth shape displayed on the reference image and a mouth shape of the user displayed on the comparison image. In this case, an area corresponding to the mouth by using colors from the image data may be extracted. Again, a characteristic point of the extracted area may be extracted. This characteristic point, for example, may be an upper point and a lower point, or sides of lip. Furthermore, mouth shape information such as ratio of vertical length and horizontal length of mouth may be extracted. The analysis data may be obtained from the position of the extracted characteristic point and the mouth shape information.

Alternatively, according to the present disclosure, the analysis data may include information on a device that has moved or an apparatus that has been disappeared by comparing indoors/outdoors scenes photographed different times by generating a comparison image taken indoors or outdoors at the present time after the pre-taken reference image is stored in the memory 16 by using the camera 12, where the pre-taken reference image is taken in the same indoors or outdoors space.

Alternatively, the analysis data may include an analysis data directly inputted by the user. For example, the user may use the analysis data such as point, valuation opinion or priority on the comparison images, which the user has determined by means of user input unit 19. In this case, the user input unit 19 may be in the form of text input button in order that the user may directly input analysis information in the form of text.

Alternatively, the video analysis unit 17 may generate the analysis data on the reference image by analyzing in advance the human's skeleton structure, shape of the lip, the position located in the indoors/outdoors from the object that are included in the reference image. The analysis data on the reference image may be displayed in an overlaid format on the comparison image when the comparison image is displayed later.

The controller 18 controls the encoding/decoding unit 13 so that the visual image and the sound image can be encoded and decoded. Besides, the controller 18 controls to write or read a visual image and a sound image from the memory 16. Also, the controller 18 controls the memory 16 to store an analysis data, where the analysis data is generated by the video analysis unit 17, and controls the analysis data to be outputted on the display unit 14 according to user request. Furthermore, the controller 16 controls in such a manner that the data from the external memory 16-1 is received and stored in the memory 16.

The user input unit 19 is a user interface configured to receive the user request. The user input unit 19 may comprise at least one of a key button formed on the PVR or a body of TV set, and remote controller.

Here, the PVR comprises the encoding/decoding unit 13, memory 16, and controller 18. Also, the display unit 14 and speaker 15 are respectively an element of the image processing device configured to output the data stored in the PVR in the form of images and sound. The example of the image processing device may be a TV set. Besides, the tuner 11 may be installed in the TV set or PVR. Furthermore, the PVR may be intrinsically installed in the TV, and in this case, the key button configured to receive the user request, where the key button is a kind of the user input unit 19, may be installed in the body of TV set.

MODE FOR THE INVENTION

Figure 2:
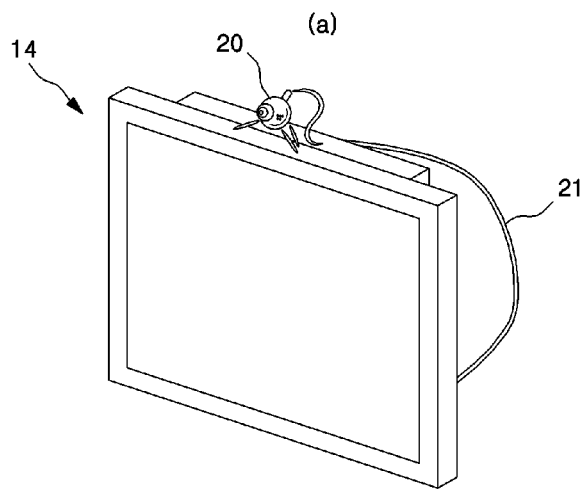
FIG. 2 are detailed diagrams of a camera according to one embodiment of the present disclosure.
Figure 2:
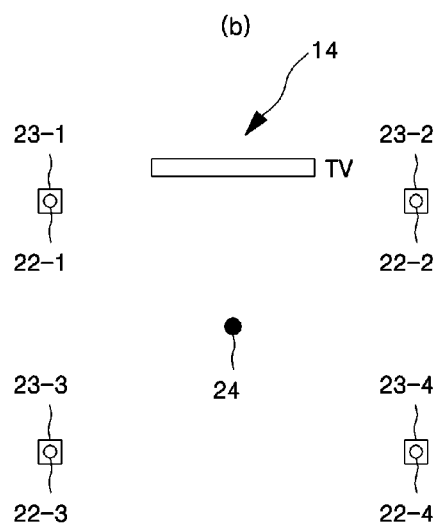

FIG. 2 are detailed diagrams of an camera according to one embodiment of the present disclosure.

At first, as shown in FIG. 2a, the camera 12 according to the present disclosure may include a single camera 20 which may be installed on an upper portion of the display unit 14. FIG. 2a show an example where the display unit 14 is a TV set. In this case, the single camera 20 may be connected to the TV set via a the cable 21 or may be wirelessly connected to the TV set. Besides, the camera 20 may be installed within the TV set or near the TV set in order that the scene in which user simulates the movement of object included in the reference image by watching the reference image replayed on the TV set, can be taken.

Furthermore, as shown in FIG. 2b, the camera 12 according to the present disclosure may be made of a plurality of cameras 22-1 to 22-4. As shown in FIG. 2b, a plurality of speakers 23-1 to 23-4 are arranged near the display unit 14 (e.g., TV set) as in a home theater system. In this case, the cameras 22-1 to 22-4 may be arranged on each speaker 23-1 to 23-4 one by one. In this case, the cameras 22-1 to 22-4 may be arranged to surround the user watching TV. The each camera 22-1 to 22-4 may take a picture of a scene in which the user simulates the movement of an object (human, device, and so on) included in the reference image at different angles while the user 24 watches the reference image replayed on the TV. Accordingly, the plurality of cameras 22-1 to 22-4 may generate images where the user's movement is photographed at different angles.

Figure 3:
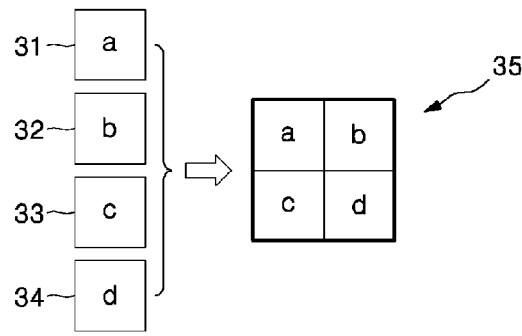
FIG. 3 is a diagram to explain a principle to make an image using a plurality of cameras according to one embodiment of the present disclosure.

FIG. 3 is a diagram explaining a principle of making an image using a plurality of cameras according to one embodiment of the present disclosure. Referring back to FIG. 2b, a big image 35 may be formed by connecting 4 images, when obtaining the 4 images on the one subject at different angles by using a plurality of the cameras 22-1 to 22-4, Reference numeral 31 in FIG. 3 is an image (a) taken by a first camera 23-1, a numeral 32 is an image (b) taken by a second camera 23-2, a numeral 33 is an image (c) taken by a third camera 23-3, and a numeral 34 is an image (d) taken by a first camera 23-4.

Accordingly, the one image 35 may comprise all the images 31, 32, 33, 34 in which the subject is viewed at different angles.

Figure 4:
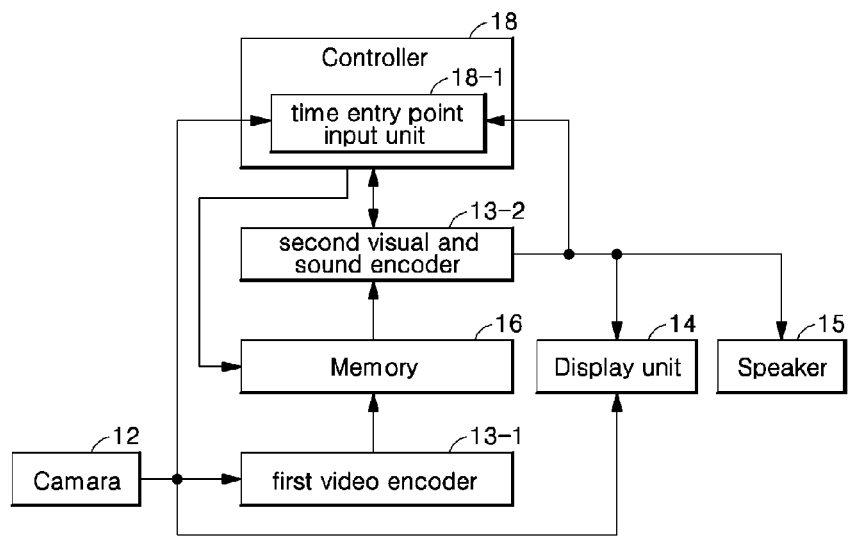
FIG. 4 is a diagram to explain a process for obtaining an image using the camera according to one embodiment of the present disclosure.

FIG. 4 is a diagram explaining a process for obtaining an image using a camera according to one embodiment of the present disclosure. To be more specific, FIG. 4 is a diagram where the elements of the image comparison device 10 are rearranged in order of obtaining step of an image using the camera according to one embodiment of the present disclosure.

As shown in FIG. 4, an image obtained from the camera 12 is encoded by the video encoder 13-1 in MPEG and stored in the memory 16 in the form of bitstream. Besides, the image obtained from the camera 12 may be outputted to the display unit 14 in real time so that the user can watch the images taken currently by the camera 12. In this case, it is preferable that the comparison image be displayed on a part of a screen e.g., in PIP (picture in picture) format so that the user can watch the reference images currently displayed the comparison image taken by the camera.

Subsequently, when the user wants to watch the comparison image according to the present disclosure, the controller 18 controls in such a manner that the visual data and the sound data on the reference image stored in the memory 16 may be outputted to the display unit 14 and speaker 15, respectively, by user's request inputted from the user input unit 19. At this moment, a visual data and a sound data on the reference image stored in the memory 16 are encoded by a second visual and sound encoder 13-2, and then the encoded visual data is provided to the display unit 14 while the encoded sound data is provided to the speaker 15. Accordingly, the reference image may be displayed on the display unit 14 along with comparison image. At the same time, the sound signal on the reference image can be outputted to the speaker 15.

In this case, since the sound signal of the reference image is outputted to the speaker 15 while the comparison image is displayed on the screen of the display unit 14, the lip-synchs relative to the comparison image and the sound signal of the reference image may be made. That is, the user can visually compare his image included in the comparison image with the reference image and audibly check whether his movement accords with the sound relative to the reference image time-wise.

Furthermore, the present disclosure may have a time entry point input unit 18-1 so that time information corresponding to the reference image and the comparison image can be stored. The time entry point input unit 18-1 may be installed in the controller 18. The time entry point input unit 18-1 generates information on the recording start time and recording termination time of the comparison image and time information per unit on the comparison image while the reference image is replayed.

Besides, the first video encoder 13-1 and the second video and sound decoder 13-2 may be installed in the encoding/decoding unit 13.

Figure 5:
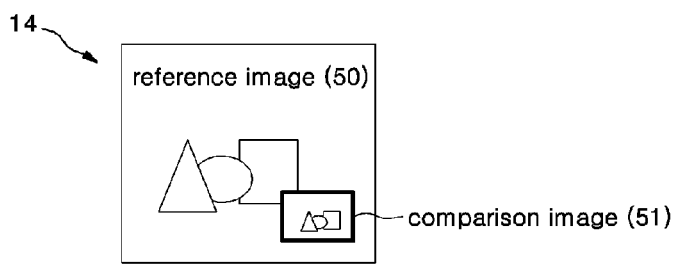
FIG. 5 is a diagram to show a structure of a screen when the comparison image is recorded using the camera according to one embodiment of the present disclosure.

FIG. 5 is a diagram illustrating a screen structure when the comparison image is recorded using the camera according to one embodiment of the present disclosure.

As shown in FIG. 5, a reference image 50 which is now displayed on a screen of the display unit 14 and the comparison image taken by the camera 14 may be displayed at the same time so that the user can watch himself while the user simulates the movement of object included in the reference image 50. The reference image 50 may be displayed in big size on the entire screen and the comparison image may be displayed in small size on the screen. It is preferable that the comparison image be displayed in the form of PIP or in the form of overlay.

Figure 6:
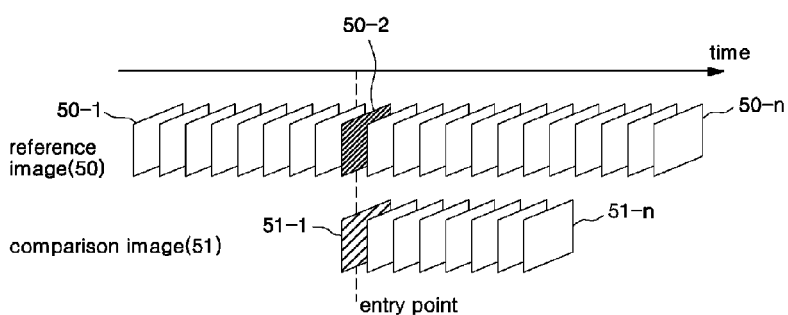
FIG. 6 is a diagram to explain a principle where time information corresponding to a reference image and a comparison image is set, according to one embodiment of the present disclosure.

FIG. 6 is a diagram explaining a principle in which time information corresponding to the reference image and the comparison image is set, according to one embodiment of the present disclosure.

The time information on the each image is stored so that the time synchronization (synch) can be accorded or that a user may choose an image corresponding to a specific position in the reference image and the comparison image.

To this end, the memory 16, as shown in FIG. 6, stores the reference image comprised of consecutive still images 50-1 to 50-*n*, as well as time information on each still images 50-1 to 50-*n* included in the reference image 50. A transport stream (TS), a program stream (PS) or a position of the bitstream file data corresponding to each still image 51-1 to 51-*n* in the memory 16 where the reference image is stored can be the time information.

Moreover, in the memory 16 according to the present disclosure, the recording start time of the comparison image 51 (that is, the time information corresponding to the first image 51-1 in the comparison image 51), is stored by matching with the time information on the specific still image 50-2 of image the reference image, while the reference image 50 is displayed on the screen, where the comparison image is made of a group (that is, a moving image) of consecutive still images 51-1 to 51-*n*.

Here, the specific image 50-2 of the reference image 50 corresponding to the first image 51-1 of the comparison image 51 is an image replayed at the same time or with a least time gap at the time of taking a picture of the first image 51-1 in the comparison image 51 among the each reference image 50-1 to 50-*n*.

As noted above, the movement of the object included in the reference image 50 and the movement of the subject included in the comparison image 51 can be synched by matching time informations of the comparison image 51 and the reference image 50, when the comparison image 50 and the reference image are compared through one screen.

Moreover, in the present disclosure, the recording start information of the comparison image, the recording termination time information corresponding to the last image 51-*n* of the comparison image and the time information on each image per unit time during photographing the comparison image 51 may be stored in the memory 16.

As described above, by matching the recording start time, termination time, and the time information on the recording time per unit, the movement of the object included in the reference image 50 and the movement of the subject included in the comparison image 51 may be compared in the operation unit or time unit when the comparison image 51 and the reference image 50 are compared later through one screen.

Figure 7:
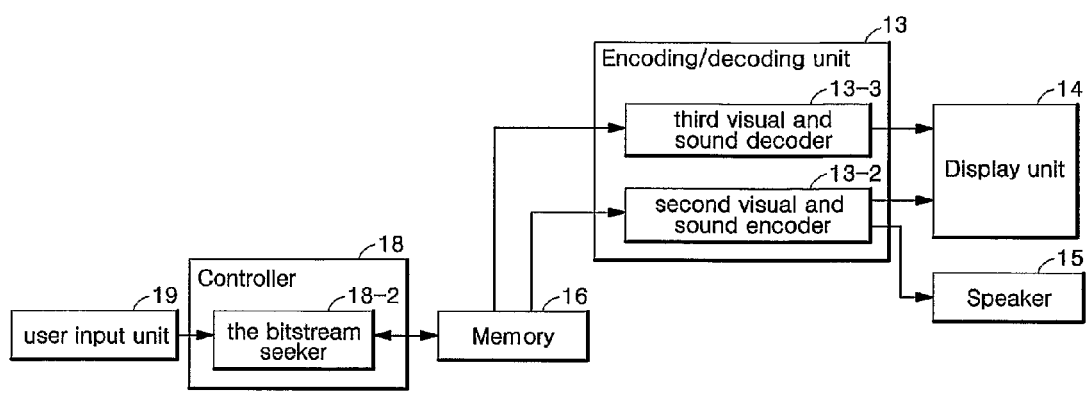
FIG. 7 is a diagram to explain a process for outputting the reference image and the comparison image according to one embodiment of the present disclosure.

FIG. 7 is a diagram explaining a process for outputting the reference image and the comparison image according to one embodiment of the present disclosure.

FIG. 7 is a diagram where the elements of the image comparison device 10 are rearranged in order of obtaining step of outputting the reference image and the comparison image according to one embodiment of the present disclosure.

As shown in FIG. 7, the bitstream seeker 18-2 installed in the controller 18 controls so that the specific position of the reference image stored in the memory 16 and the corresponding position of the comparison image can be searched and that the searched reference image and the searched comparison image can be outputted to decoding unit 13, when the image comparison request is inputted from the user input unit 19.

Then, the decoded visual data is provided to the display unit 14, and the decoded sound data is provided to the speaker 15 after the second visual and sound decoder 13-2 decodes the visual data and the sound data on the reference image. Accordingly, the reference image may be displayed on the display unit 14, and the sound signal on the reference image may be outputted to the speaker 15.

Moreover, the decoded visual data is provided to the display unit 14 after the third visual and sound decoder 13-3 decodes the visual data on the comparison image. Accordingly, the comparison image may be displayed on the display unit 14. Besides, the third visual and sound decoder 13-3 may be installed within the encoding/decoding unit 13 according to the present disclosure.

Figure 8:
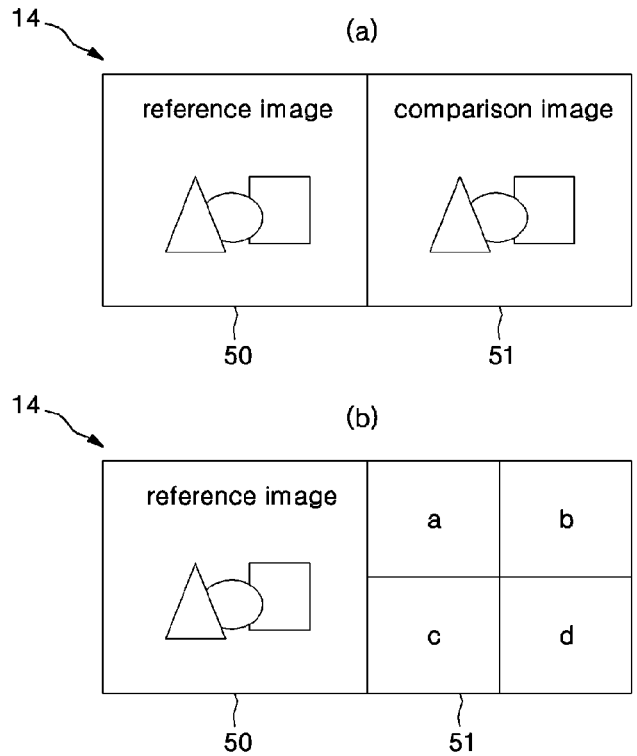
FIG. 8 are diagrams of a screen structure for comparing images by using the camera according to one embodiment of the present disclosure.

FIG. 8 is a diagram of a screen structure for comparing images by using a camera according to one embodiment of the present disclosure.

As shown in FIG. 8a, the reference image 50 and the comparison image 51 are displayed on one screen of the display unit 14 at the same time so that the user can compare the reference image 50 and a figure or a shape chasing the movement of an object included in the reference image.

To this end, as shown in the FIG. 8a, the one screen formed by the display unit 14 is divided into two. A left half of the screen is a first area displaying the reference image 50 and a right half of the screen is a second area (which is not overlapped by the first area) displaying the comparison image 51.

Accordingly, the user can compare the movement of the object included in the reference image 50 with the movement of the user's figure or shape simulating the movement of the object in equal size, wherein the user's shape is included in the comparison image 51. Therefore, the user can easily figure out what is wrong in his movement.

Besides, as shown in the FIG. 8b, in case that a plurality of images per unit a,b,c,d on the subjection is obtained by using a plurality of cameras at the different angles, the second area which is the right half of the screen is divided equally to display the each comparison image a,b,c,d in the divided area. At this point, the comparison image per unit constitutes a portion of the entire comparison image 51.

Accordingly, the user can compare the movement of the object included in the reference image 51 and the movement of the user's shape simulating the movement of the object in equal size, where the user's shape is included in the comparison image 51 and the user's scene is taken at the different angles. Therefore, the user can figure out what is wrong in his movement from various aspects.

Figure 9:
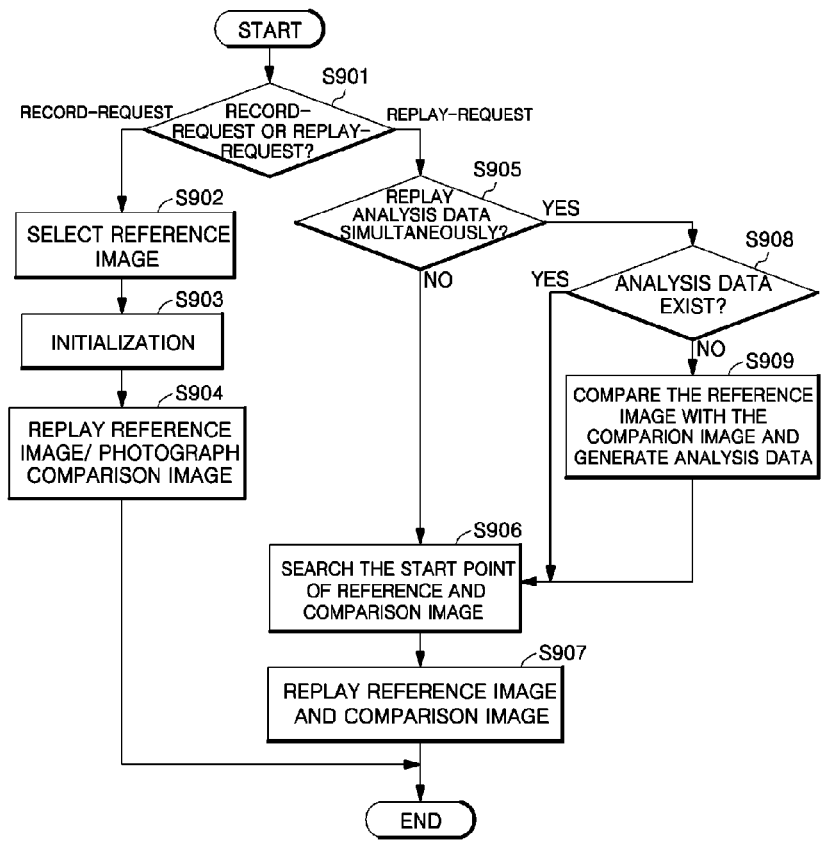
FIG. 9 is a flow chart to explain a method for comparing images using a personal video recorder, according to one embodiment of the present disclosure.

FIG. 9 is a flow chart explaining a method for comparing images using a personal video recorder, according to one embodiment of the present disclosure.

Referring to the FIG. 9, the image comparison device according to the present disclosure first determines whether a request inputted from the user input unit 19 is a record-request for taking a picture, or a replay-request for comparing the reference image with the comparison image (S901).

As a result of determination in S901, if the record-request is inputted from the user, the user may select the reference image stored in the memory 16 through the user input unit 19, or the user may select the broadcasting program received from the tuner 11 as the reference image (S902).

Then, the controller progresses a standby state for several seconds so that the user can prepare the recoding and the system can be initialized (S903).

Successively, if the user inputs the record-request through the user input unit 19 in a state where the preparation is completed, the controller 18 controls so that the shape of the user simulating the movement of the object included in the reference image during replaying the reference image can be recorded and the taken comparison image can be encoded to be stored in the memory 16 by means of MPEG (S904). Such recording steps of the comparison image may be set up to be terminated when the user inputs the termination request through the user input unit 19 or the replay of the reference image is terminated.

On the other hand, as a result of determination in S 901, if the user inputs the replay-request, the controller 18 determines whether the replay-request for replaying the analysis data at the same time is received (S905).

As a result of determination in S905, if the user does not input the replay-request for replaying the analysis data simultaneously, the controller 18 searches for replay start positions of the reference image and the comparison image (S906), and encodes the reference image and the comparison image in the form of MPEG. Then, the reference image and the comparison image are synchronized to be displayed (S907). At this point, the video signal and the sound signal of the reference image are outputted to the display unit 14 and the speaker 15, respectively, and the video signal of the comparison image is outputted to the display unit 14.

Alternatively, as a result of determination in S905, if the user inputs the replay-request for replaying the analysis data simultaneously, the controller 18 determines whether the analysis data based on a difference between the reference image and the comparison image exists in the memory 16 (S908).

As a result of determination in S908, in case that the analysis data exists, the S906 is progressed, and then the controller searches the replay start positions of the reference image and the comparison image S906 where the reference image and the comparison image are synchronized for display. At this time, the comparison image displayed on the display unit 14 may be displayed along with the analysis data according to the present disclosure.

However, as a result of determination in S908, in case that the analysis data does not exist, the video analysis unit 17 compares the reference image with the comparison image and generates an analysis data based on a difference between the reference image and the comparison image, or generates an analysis data on the reference image from the movement of the object included in the reference image to store the analysis data on the reference image in the memory, or replay the reference image and the comparison image by progressing to S906 and S907 after the analysis data is directly stored in the memory 16 through the user input unit 19 by receiving the analysis data from the user (S909).

In case that the posture in the reference image such as golf, ski and yoga lesson images, and dance moving images is an important element, the analysis data may comprise posture correction information which is generated on the basis of a difference between the reference image and the comparison image by using human's basic skeleton structure as a basic human body model, by searching a match point between the reference image and comparison image, and by analyzing similarity of the motion and so on.

Alternatively, the analysis data may include the pronunciation correction information which is generated on the basis of a difference between the mouth shape displayed on the reference image and the mouth shape of the user displayed on the comparison image, when the reference image is for teaching the English pronunciation.

Alternatively, according to the present disclosure, the analysis data may include the information on the device that has moved or apparatus that has disappeared by comparing indoors/outdoors scenes taken at different times by generating the comparison image taken indoors or outdoors at the present time after the pre-taken reference image is stored in the memory 16 by using the camera 12, where the pre-taken reference image is taken in the same indoors or outdoors space.

The analysis data may include an analysis data such as point, valuation opinion or priority on the comparison images, by means of user input unit 19, and the analysis data is directly inputted by the user.

Alternatively, the video analysis unit 17 may generate in advance the analysis data on the reference image by analyzing the human's skeleton structure, the lip's shape, the position located indoors/outdoors from the object included in the reference image. The analysis data on the reference image may be displayed to be overlaid on the comparison image when the comparison image is displayed later.

It is to be understood that both the aforementioned general description and the detailed description of the present disclosure are exemplary and explanatory and are intended to provide further explanation of the invention as claimed.

INDUSTRIAL APPLICABILITY

This present disclosure may be applied to the electronic manufacturing field such as Digital TV, PVR, and mobile terminal.

The invention claimed is:

1. A method for displaying a plurality of videos in a display device, the method comprising:
    displaying a reference video;
    acquiring a comparison video via a camera of the display device while displaying the reference video;
    displaying the acquired comparison video with the reference video, wherein the reference video is displayed on a first window and the comparison video is displayed on a second window;
    storing time information on reproduction of the reference video;
    searching a reproducing position of the displayed reference video based on the stored time information; and
    generating analysis data based on both the searched reproducing position of the displayed reference video and the stored time information on the reference video,
    wherein the first window and the second window are simultaneously and separately displayed on a screen of the display device, and
    wherein a size of the comparison video is different from a size of the reference video,
    storing, in a memory, the acquired comparison video and information on the acquired comparison video, wherein the storing the acquired comparison video and the information comprises:
        determining a movement of an object in the reference video and a movement of an object in the comparison video, and
        storing, in the memory, a determined result for the reference and comparison videos;
    receiving a request for outputting analysis data based on the stored determined result, wherein the analysis data comprises posture correction information that is generated based on the determined result between the reference video and the comparison video by using a human's basic skeleton structure as a basic human body model, the human's basic skeleton structure is displayed as a line, and a human's joint is displayed as a point;
    outputting the analysis data on the screen;
    searching a match point between the reference video and the comparison video;
    analyzing a similarity of the searched match point; and
    outputting analysis data on the posture shape of human when the human's basic skeleton structure is analyzed around a head portion of a human.

2. The method of claim 1, wherein the comparison video is obtained by taking a picture of a present scene of a subject chasing a movement of an object included in the reference video.

3. The method of claim 1, wherein the reference video is output on a first area of the screen, and the comparison video is output on a second area of the screen at a same time, and wherein the first area and the second area of the screen are not overlapped in the screen.

4. The method of claim 1, wherein the reference video is output on a first area of the screen, and the comparison video is output on a second area of the screen at a same time, and wherein the size of the comparison video is smaller than the size of the reference video in the screen.

5. The method of claim 1, wherein the analysis data includes data inputted by a user through a user input unit of the display device.

6. The method of claim 1, wherein the displaying of the acquired comparison video with the reference video comprises outputting a sound for the reference video while simultaneously outputting the reference video and the comparison video on the screen.

7. The method of claim 1, wherein the analysis data is output on the reference video in an overlaid format on the comparison video when the comparison video is displayed later.

8. The method of claim 1, wherein the time information includes information on a recording start time and a recording termination time.

9. The method of claim 1, wherein the reference video and the comparison video are synchronized.

10. The method of claim 1, wherein the analysis data is further referred to based on a difference between the reference video and the comparison video.

11. The method of claim 1, wherein the analysis data is displayed along with at least one of the reference video and the comparison video.

12. A display device for displaying a plurality of videos, the display device comprising:
    at least one camera configured to acquire a comparison video while displaying a reference video;
    a display unit configured to display the acquired comparison video with the reference video, wherein the reference video is displayed on a first window and the comparison video is displayed on a second window, on a screen of the display unit;
    a storage unit configured to store time information on reproduction of the reference video;
    a video analysis unit configured to generate analysis data; and
    a controller configured to control to:
        acquire the comparison video via the at least one camera,
        search a reproducing position of the displayed reference video based on the stored time information,
        generate the analysis data based on the searched reproducing position of the displayed reference video and the stored time information on the reference video, and
        display the reference video on the first window and the comparison video on the first window, wherein the first window and the second window are simultaneously and separately outputted on the screen of the display device, and wherein a size of the reference video is different from a size of the comparison video,
store, in the memory, the acquired comparison video and information on the acquired comparison video, wherein the storing the acquired comparison video and the information comprises:
determine a movement of an object in the reference video and a movement of an object in the comparison video, and
store, in the memory, a determined result for the reference and comparison videos,
receive a request for outputting analysis data based on the stored determined result, wherein the analysis data comprises posture correction information that is generated based on the determined result between the reference video and the comparison video by using a human's basic skeleton structure as a basic human body model, the human's basic skeleton structure is displayed as a line, and a human's joint is displayed as a point, and
output the analysis data on the screen,
search a match point between the reference video and the comparison video;
analyze a similarity of the searched match point; and
output analysis data on the posture shape of human when the human's basic skeleton structure is analyzed around a head portion of a human.

13. The display device of claim 12, wherein the comparison video is obtained by taking a picture of a present scene of a subject chasing a movement of an object included in the reference video.

14. The display device of claim 12, wherein the controller is further configured to store, in a memory, the acquired comparison video and information on the acquired comparison video.

15. The display device of claim 14, wherein the controller is configured to:
determine a movement of an object in the reference video and a movement of an object in the comparison video; and
store, in the memory, a determined result for the reference and comparison videos.

16. The display device of claim 14, wherein the controller is further configured to:
receive a request for displaying analysis data; and
display, on the screen, the analysis data.

17. The display device of claim 12, wherein the controller controls to output a sound for the reference video while simultaneously outputting the reference video and the comparison video on the screen.

18. The display device of claim 12, wherein the controller controls to:
output the reference video on a first area of the screen, and
output the comparison video on a second area of the screen at the same time,
wherein the first area and the second area of the screen are not overlapped in the screen.

19. The display device of claim 12, wherein the controller controls to:
output the reference video on a first area of the screen, and
output the comparison video on a second area of the screen at the same time,
wherein the size of the comparison video is smaller than the size of the reference video in the screen.

20. The display device of claim 12, wherein the controller controls to:
receive a request for outputting analysis data, and
output the analysis data on the screen.

21. The display device of claim 20, wherein the analysis data includes data inputted by a user through a user input unit of the display device.

22. The display device of claim 20, wherein the analysis data comprises posture correction information that is generated based on the determined result between the reference video and the comparison video by using a human's basic skeleton structure as a basic human body model, the human's basic skeleton structure is displayed as a line, and a human's joint is displayed as a point.

23. The display device of claim 22, wherein the controller further controls to:
search a match point between the reference video and the comparison video,
analyze a similarity of the searched match point, and
output analysis data on the posture shape of human when the human's basic skeleton structure is analyzed around a head portion of a human.

24. The display device of claim 23, wherein the analysis data is output on the reference video in an overlaid format on the comparison video when the comparison video is displayed later.

25. The display device of claim 12, wherein the stored time information includes information on a recording start time and a recording termination time.

26. The display device of claim 12, wherein the controller controls the reference video and the comparison video to be synchronized.

27. The display device of claim 12, wherein the video analysis unit refers to a difference between the reference video and the comparison video for the analysis data.

28. The display device of claim 20, wherein the controller controls the analysis data to be displayed along with at least one of the reference video and the comparison video.

* * * * *